United States Patent [19]

Nakasaki et al.

[11] 4,109,696
[45] Aug. 29, 1978

[54] PNEUMATIC TIRE FOR MOTORCYCLE

[75] Inventors: Eiji Nakasaki, Kakogawa; Hishashi Shirashoji, Kobe, both of Japan

[73] Assignee: Sumitomo Rubber Industries, Ltd., Kobe, Japan

[21] Appl. No.: 711,614

[22] Filed: Aug. 4, 1976

[30] Foreign Application Priority Data

Dec. 25, 1975 [JP] Japan .................. 50-157023

[51] Int. Cl.² ............................................. B60C 9/10
[52] U.S. Cl. ........................ 152/354 R; 152/357 R; 152/362 R
[58] Field of Search ................. 152/352, 353 R, 354, 152/357 R, 362 R, 362 CS

[56] References Cited

U.S. PATENT DOCUMENTS

| | | | |
|---|---|---|---|
| 3,911,987 | 10/1975 | Takusagawa et al. | 152/354 |
| 3,980,119 | 9/1976 | Nakasaki | 152/354 |
| 3,983,920 | 10/1976 | Gardner et al. | 152/354 |

Primary Examiner—Albert J. Makay
Assistant Examiner—D. W. Underwood
Attorney, Agent, or Firm—Birch, Stewart, Kolasch & Birch

[57] ABSTRACT

A pneumatic tire for use on a motorcycle, comprising a tire cover having a tread portion, a pair of opposed side walls integral with the tread portion and a pair of opposed bead portions integral with the respective side walls and adapted to firmly engage with associated rim flanges of a wheel rim. The tire cover includes a reinforcing structure for preventing the tire from collapsing when it is at least partially deflated, which reinforcing structure comprises a bias-ply carcass, a reinforcement layer of steel cord and a pair of side reinforcing layers embedded in the tire cover adjacent the respective side walls. The reinforcement layer has both ends terminating adjacent and in spaced relation to the bead cores within the bead portions and is made of a plurality of juxtaposed steel wires or cords.

1 Claim, 1 Drawing Figure

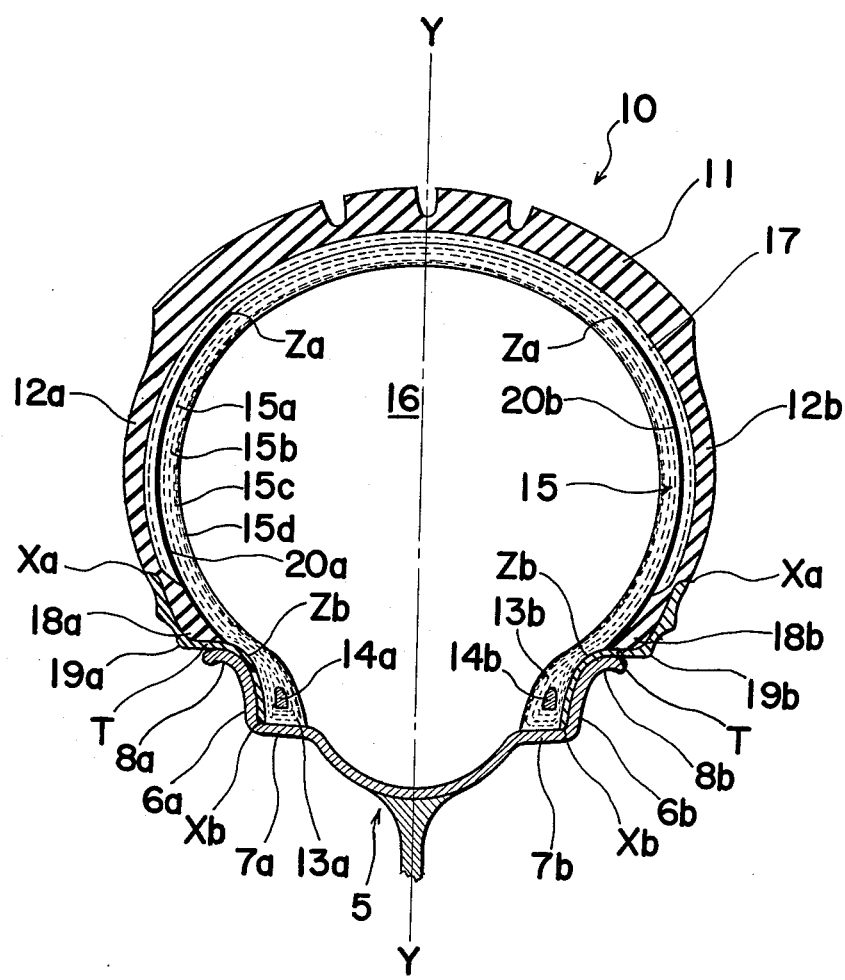

PNEUMATIC TIRE FOR MOTORCYCLE

BACKGROUND OF THE INVENTION

The present invention relates to a pneumatic tire and, more particularly, to a bias-ply tire suited for use on a motorcycle.

There is known a pneumatic tire which comprises a tire cover made of rubber material and having a tread portion, a pair of opposed side walls and a pair of opposed bead portions, and a reinforcing structure for preventing the tire from collapsing when it is at least partially deflated. The reinforcing structure includes a bias-ply carcass structure, embedded in the tire cover adjacent the inner surface thereof and having opposed ends turned up around and anchored to respective bead cores embedded in the bead portions, and at least one reinforcement layer made of cords of metallic material. The reinforcement layer in this known pneumatic tire is laid down on a bias relative to the midcircumferential plane of the tire and in opposite relation to the bias-ply carcass structure and has both ends terminating adjacent respective boundaries between the side walls and the bead portions and without being turned up around and anchored to the bead cores.

The known pneumatic tire of the above construction has been developed to provide such a feature that, even though puncture occurs in the tire during its use on a motorcycle, the motorcycle can be driven at a predetermined speed to the nearest possible repair shop without substantially adversely affecting the punctured tire. This known pneumatic tire is advantageous in that the tire during its use on a motorcycle is not readily crushed upon puncture thereof and the presence of the reinforcement layer allows the rigidity of the tire to be substantially retained to such an extent that the motorcycle having a payload imposed thereon can be driven at a reasonable speed to the nearest possible repair shop.

Although the known pneumatic tire of the above construction is satisfactory in that a motorcyclist need not be embarrassed at the time the tire on his motorcycle being operated has been pierced, some disadvantages have been found particularly when it is used as a front wheel tire on the motorcycle. These disadvantages include reduction in cushioning effect of the tire with consequent reduction in riding comfort and reduction in steerability of the motorcycle and are attributable to the fact that the tire in question tends to exhibit an excessive rigidity. These are particularly considerable where the motorcycle is driven at a speed of about 60 km/hr. or more.

Specifically, the reduction in cushioning effect of the tire due to the excessive rigidity thereof is undesirable not only because of the consequent reduction in riding comfort, but also because of a considerable amount of vibrations being transmitted to the prime mover, that is, the engine. In addition, the reduction in steerability tends to force the driver or motorcyclist to over-steer during high speed drive.

SUMMARY OF THE INVENTION

Accordingly, the present invention is intended to provide an improved version of the pneumatic tire of use on a motorcycle is not readily be crushed upon puncture thereof and the presence of the reinforcement layer allows the rigidity of the tire to be substantially retained to such an extent that the motorcycle having a payload imposed thereon can be driven at a reasonable speed to the nearest possible repair shop.

The known pneumatic tire of the above construction is satisfactory in that a motorcyclist need not be embarrased at the time the tire on his motorcycle being operated has been pierced.

SUMMARY OF THE INVENTION

The present invention is, however, intended to provide an improved version of the pneumatic tire of the above described construction, with which the motorcycle having a payload can be driven at a reasonably high speed over a longer distance than afforded by the known tire of the above described construction. This object can be achieved by the employment of at least one pair of side reinforcing layer of a hard rubber material embedded in spaced and substantially opposed relation to each other in the tire cover at respective positions corresponding to the opposed side walls of the tire, for the purpose of minimizing flexion of the side walls which may take place in a repeated manner subsequent to the puncture of the tire and which may result in break at one or both of the side walls.

BRIEF DESCRIPTION OF THE DRAWING

For a more complete understanding of the present invention, reference will now be had to the accompanying drawing which is a sectional view of a pneumatic tire embodying the present invention.

DETAILED DESCRIPTION OF THE INVENTION

Referring to the accompanying drawing, it will readily be understood that the tire or tire cover 10 so far illustrated comprises a tread portion 11, a pair of side wall portions 12a and 12b opposed to each other and contiguous to both sides of the tread portion 11, and a pair of bead portions 13a and 13b in which bead cores 14a and 14b are respectively embedded.

The tire cover 10 also includes a bias-ply carcass 15 facing a pneumatic chamber 16 defined in the tire cover 10. The bias-ply carcass 15 may be composed of at least two layers of textile cord of natural or synthetic fiber and, so far illustrated, it is shown as composed of four layers of textile cord which are represented by carcass plies 15a, 15b, 15c and 15d adjoining to each other. The cords forming the carcass plies 15a to 15d are alternately laid down on a bias with respect to each other and at a predetermined acute cord angle in any known manner relative to the midcircumferential plane lying at right angles to the plane of the accompanying drawing, which midcircumferential plane appears as a line Y—Y in the drawing because of cross sectional representation of the tire.

Each of the carcass plies 15a to 15d extends between the bead portions 13a and 13b with both ends thereof innerwardly turned up around the respective bead cores 14a and 14b and secured in position within the bead portions 13a and 13b, a substantially intermediate portion thereof extending immediately below the tread portion 11.

The total thickness of the bias-ply carcass 15, that is, the sum of thickness of the carcass plies 15a to 15d, is preferably at least 4 or more millimeters.

The tire so far described is shown as mounted on a wheel rim 5 of one of wheel structures of a motorcycle (not shown) in such a manner that the bead portions 14a and 14b are elastically held flat against rim flanges 6a and 6b at respective sides of the rim 5 and also against bead seats 7a and 7b of the wheel rim 5, respectively, in any known manner.

A reinforcement layer 17, composed of a plurality of steel cords which are arranged in parallel relation to each other and impregnated with a rubber material, is shown as embedded in between the tire and side wall rubber and the radially outermost carcass ply 15a and has both ends terminating adjacent the respective boundaries between the bead portions 13a and 13b and the side wall portions 12a and 12b.

The number of the reinforcement layers of steel cord is not always limited to one as shown, but may be two or more, in which case, while one reinforcement layer is, as shown by 17, positioned in between the tire and side wall rubber and the radially outermost carcass ply 15a, the other or others may be positioned in between the adjacent pair of carcass plies of the carcass 15. Moreover, even though the single reinforcement layer 17 is employed as shown, the position of the reinforcement layer 17 is not limited to the radially outside of the radially outermost carcass ply 15a, but may be embedded in between any adjacent pair of the carcass plies 15a to 15d.

In any case, the juxtaposed steel wires or cords forming the reinforcement layer 17 may have a cord angle within the range of from 20° to 45° relative to the midcircumferential plane Y—Y and is laid down on a bias relative to the cords of the adjacent one of the carcass plies 15a to 15d which is in contact with such reinforcement layer 17.

It is to be noted that the reinforcement layer 17 cooperates with the carcass plies 15a to 15d to provide a reinforcing structure which represents the principal reinforcing portion of the tire necessary to support a portion of the payload on the motorcycle, which payload portion is imposed on the wheel on which the tire of the present invention is mounted. Since the reinforcing structure represents the principal reinforcing portion of the tire so far described, it can sufficiently and adequately support that portion of the payload on the motorcycle.

As best shown in the accompanying drawing, each of the side wall portions 12a and 12b has an excrescence 18a or 18b protruding outwards in a direction remote from the pneumatic chamber 17 and formed at a position adjacent the outer periphery of the associated rim flange 6a or 6b when the tire of the present invention is mounted on the rim 5. Each excrescence 18a or 18b extends over the entire circumference of the tire at that position adjacent the outer periphery of the associated rim flange 6a or 6b.

Each of these excrescences 18a and 18b may have any cross sectional shape so far as it sufficiently serves to assure a firm engagement of the associated bead portion 13a or 13b against the adjacent rim flange 6a or 6b without substantially inviting any possible separation of the bead portion from the rim flange when the tire is pierced and consequently deflated.

In order to prevent one or both of the excrescences 18a and 18b on the respective side wall portions 12a and 12b from being damaged by wear in frictional contact with the outer peripheries of the associated rim flanges 6a and 6b of the wheel rim 5, protective layers 19a and 19b one for each side of the tire with respect to the midcircumferential plane Y—Y are applied to outer surfaces of the excrescences 18a and 18b and of portions of the bead portions 13a and 13b which are not in contact with the bead seats 7a and 7b, respectively.

More specifically, the protective layers 19a and 19b are made of rubber material having a suitable hardness, preferably, a JIS hardness of about 70° or more as measured by the method stipulated in the Japanese Industrial Standards for which the abbreviation "JIS" stands. In addition, each of these protective layers 19a and 19b has an annular width, i.e., the difference between the inner and outer diameters thereof, which is so selected that, when it is applied in the manner as shown and described above, an outer periphery of the protective layer 19a or 19b is located at a radially outer position, as a Xa, on the coresponding side wall portion 12a or 12b from which the tire rubber starts to protrude outwards to provide the associated excrescence 18a or 18b, while an inner periphery of the same protective layer 19a or 19b terminates, as at Xb, in flush with a radially innermost side of the associated bead portion 13a or 13b which is held in contact with the bead seat 7a or 7b on the wheel rim 5. Preferably, each of these protective layers 19a and 19b has a maximum thickness of at least 1 mm. at a portion intermediate of the annular width thereof and at a portion thereof which may be held in contact with the outer periphery of the rim flange 6a or 6b when the tire is mounted on the wheel rim 5, which portion is indicated by T. The thickness of respective portions of each of the protective layers 19a and 19b adjacent the inner and outer peripheries thereof is gradually reduced towards the positions Xa and Xb, respectively.

In the pneumatic tire of the present invention, there is provided side reinforcing layers 20a and 20b, one for each side of the tire cover 10, for the purpose of minimizing flexion of the side walls which may occur during its use on the motorcycle and subsequent to the puncture thereof and also keeping the tire in balanced condition relative to the payload on the motorcycle. These side reinforcing layers 20a and 20b are made of rubber material having a hardness substantially equal to that of an undertread immediately below the tread portion 11 and a JIS hardness of about 60°.

In the illustrated embodiment, each of the side reinforcing layers 20a and 20b is shown as embedded in between the reinforcement layer 17 and the radially outermost carcass ply 15a at a position corresponding to the side wall portion 12a or 12b and has an annular width so selected that an outermost periphery thereof is situated at a point Za corresponding to the boundary between the tread portion 11 and the side wall portion 12a or 12b while an innermost periphery thereof is situated at a point Zb corresponding to a shoulder 8a or 8b of the rim flange 6a or 6b of the wheel rim 5.

It is to be noted that the number of pairs of the side reinforcing layers 20a and 20b is not always limited to one as shown, but may be two or more and equal to or less than the number of the carcass plies of the bias-ply carcass 15, in which case, while one pair of the side reinforcing layers are, as shown by 20a and 20b, positioned in between the reinforcement layer 17 and the radially outermost carcass ply 15a in spaced and substantially opposed relation to each other, the other pair or pairs of side reinforcing layers may be positioned in between the adjacent pair of carcass plies. Moreover, even though the single pair of the side reinforcing layers 20a and 20b is employed such as shown, the position of the side reinforcing layers 20a and 20b is not limited to the radially outside of the radially outermost carcass ply 15a and the radially inside of the reinforcement layer 17, but may be embedded in between any adjacent pair of the carcass plies 15a to 15d.

The number of pairs of the side reinforcing layers 20a and 20b is preferably selected in consideration of the possible payload which the wheel of the motorcycle having the tire of the present invention mounted thereon may receive.

The side reinforcing layers 20a and 20b arranged in the manner described above are to be understood as constituting the principal reinforcing portion of the tire together with the reinforcement layer 17 and the carcass 15.

With the pneumatic tire embodying the present invention, it has been demonstrated that, even after the tire of the present invention inflated to a normal pneumatic pressure and used in actual driven until the tread portion 11 having a plurality of tread grooves worn to 6 mm. in depth of the tread grooves has been pierced, the motorcycle can be driven at 80 to 120 km/hr. over a distance up to 1,000 km. without substantially adversely affecting the tire and without inviting any separation of the bead portions from the rim flanges.

Although the present invention has fully been described in connection with the preferred embodiment thereof, it is to be noted that various changes and modifications are apparent to those skilled in the art. Such changes and modifications are to be construed as included within the true scope of the present invention unless they depart therefrom.

We claim:

1. A pneumatic tire for use on a motorcycle, which comprises a tire cover made of a rubber material and having a tread portion, a pair of opposed side walls integrally extending from respective side edges of the tread portion, and a pair of opposed bead portions integrally extending from respective free ends of the individual side walls, said bead portions being adapted to firmly engage with associated rim flanges of a wheel rim, said tire cover including bead cores embedded respectively in the bead portions and a reinforcing structure for preventing the tire from collapsing when it is at least partially deflated which comprises a carcass structure embedded in the tire cover adjacent the inner surface thereof, said carcass structure having a plurality of plies of textile cords which are alternately disposed on a bias with respect to each other and at a predetermined cord angle relative to the midcircumferential plane of the tire, said carcass structure having both ends turned up around the respective bead cores and secured in position adjacent the free ends of the side walls, at least one reinforcement layer substantially forming a part of the carcass structure and made of a plurality of metallic cords impregnated with a rubber material, said reinforcement layer being laid down on a bias relative to the carcass structure and at a cord angle within the range of from 20° and 45° relative to the midcircumferential plane of the tire and having both ends terminating adjacent respective boundaries between the side walls and the bead portions without being turned up around the associated bead core, at least one pair of side reinforcing layer made of a hard rubber material and respectively embedded in between the carcass structure and the reinforcement layer in spaced and substantially opposed relation to each other, each of said side reinforcing structure having an outer periphery, which is situated at a point corresponding to the boundary between the tread portion and the adjacent side wall, and an inner periphey which is situated at a point corresponding to a shoulder of the rim flange when the tire is mounted on the wheel rim, said reinforcing structure representing the principal reinforcing portion of the tire, each of said side walls having an outwardly protruding and circumferentially extending excrescence integrally formed therewith at a portion of the side wall which may contact an outer periphery of the corresponding one of the rim flanges when the tire is mounted on the wheel rim and at least one pair of protective layers made of a hard rubber material, each of said protective layers being applied to outer surfaces of the excrescence and said bead portions.

* * * * *